United States Patent
Kneller

(10) Patent No.: US 9,847,166 B2
(45) Date of Patent: Dec. 19, 2017

(54) EMBEDDED MAGNETIC COMPONENT TRANSFORMER DEVICE

(71) Applicant: Murata Manufacturing Co., Ltd., Nagaokakyo-shi, Kyoto-fu (JP)

(72) Inventor: Quinn Kneller, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 214 days.

(21) Appl. No.: 14/883,863

(22) Filed: Oct. 15, 2015

(65) Prior Publication Data
US 2016/0111200 A1 Apr. 21, 2016

(30) Foreign Application Priority Data

Oct. 17, 2014 (GB) .................................. 1418478.2

(51) Int. Cl.
| | |
|---|---|
| *H01F 27/28* | (2006.01) |
| *H01F 5/00* | (2006.01) |
| *H01F 17/04* | (2006.01) |
| *H01F 27/38* | (2006.01) |
| *H02M 3/338* | (2006.01) |

(52) U.S. Cl.
CPC ....... *H01F 27/288* (2013.01); *H01F 27/2804* (2013.01); *H01F 27/2895* (2013.01); *H01F 27/38* (2013.01); *H01F 2027/2809* (2013.01); *H02M 3/3387* (2013.01); *Y02B 70/1433* (2013.01)

(58) Field of Classification Search
CPC .................................................. H01F 27/2895
USPC ......................................................... 336/229
See application file for complete search history.

(56) References Cited

U.S. PATENT DOCUMENTS

| | | | | |
|---|---|---|---|---|
| 5,781,091 A | * | 7/1998 | Krone | H01F 17/0033 336/200 |
| 5,959,846 A | * | 9/1999 | Noguchi | H01F 17/0033 257/690 |
| 6,990,729 B2 | * | 1/2006 | Pleskach | H01F 17/0033 156/250 |
| 7,375,611 B1 | * | 5/2008 | Pleskach | H01F 27/2804 336/229 |

(Continued)

FOREIGN PATENT DOCUMENTS

| | | |
|---|---|---|
| EP | 0 856 855 A2 | 8/1998 |
| GB | 1315185 A | 4/1973 |
| WO | 98/56016 A1 | 12/1998 |

OTHER PUBLICATIONS

Kneller et al.; "Embedded Magnetic Component Transformer"; U.S. Appl. No. 15/019,240, filed Feb. 9, 2016.
Parish et al.; "Embedded Magnetic Component Device"; U.S. Appl. No. 15/054,412, filed Feb. 26, 2016.
Lloyd; "Embedded Magnetic Component"; U.S. Appl. No. 15/049,414, filed Feb. 22, 2016.

(Continued)

*Primary Examiner* — Ronald Hinson
(74) *Attorney, Agent, or Firm* — Keating & Bennett, LLP

(57) ABSTRACT

A transformer device includes primary, secondary, and auxiliary windings, located in an insulating substrate by conductive vias joined together by conductive traces. Positions of the conductive vias are arranged so as to optimize the isolation properties of the transformer, and to improve the coupling of the transformer by increasing the leakage inductance and reducing the distributed capacitance. The transformer device is compact and is weakly coupled. The weak coupling between the windings reduces the likelihood of the transformer malfunctioning, particularly when used in a self-resonant converter circuit.

20 Claims, 7 Drawing Sheets

(56) References Cited

U.S. PATENT DOCUMENTS

| | | | |
|---|---|---|---|
| 7,821,374 B2* | 10/2010 | Harrison | H01F 19/04 |
| | | | 336/192 |
| 7,982,572 B2* | 7/2011 | Schaffer | H01F 17/0033 |
| | | | 336/200 |
| 2004/0212475 A1 | 10/2004 | Schumacher | |
| 2006/0176139 A1* | 8/2006 | Pleskach | H01F 17/0033 |
| | | | 336/223 |
| 2007/0290783 A1 | 12/2007 | Whittaker et al. | |
| 2008/0186124 A1 | 8/2008 | Schaffer et al. | |
| 2009/0273428 A1 | 11/2009 | Chen | |
| 2011/0108317 A1* | 5/2011 | Harrison | H01F 17/0033 |
| | | | 174/266 |
| 2014/0043130 A1 | 2/2014 | Dalmia et al. | |
| 2015/0349628 A1* | 12/2015 | Cheng | H01F 38/14 |
| | | | 363/39 |
| 2016/0181000 A1* | 6/2016 | Yen | H01F 27/324 |
| | | | 336/220 |

OTHER PUBLICATIONS

Harber; "Embedded Magnetic Component Device"; U.S. Appl. No. 15/050,536, filed Feb. 23, 2016.

Parish et al.; "Embedded Magnetic Component Device"; U.S. Appl. No. 14/825,327, filed Aug. 13, 2015.

Kneller et al.; "Embedded Magnetic Component Device"; U.S. Appl. No. 14/825,332, filed Aug. 13, 2015.

Wang et al.; "Embedded Magnetic Component Transformer Device"; U.S. Appl. No. 14/883,855, filed Oct. 15, 2015.

Francis; "Embedded Magnetic Component Transformer Device"; U.S. Appl. No. 14/883,854, filed Oct. 15, 2015.

Kneller; "Embedded Magnetic Component Transformer Device"; U.S. Appl. No. 14/883,859, filed Oct. 15, 2015.

Wang et al.; "Embedded Magnetic Component Transformer Device"; U.S. Appl. No. 14/883,866, filed Oct. 15, 2015.

Official Communication issued in International Patent Application No. GB1418478.2, dated Apr. 20, 2015.

* cited by examiner

EMBEDDED MAGNETIC COMPONENT TRANSFORMER DEVICE

BACKGROUND OF THE INVENTION

1. Field of the Invention

The present invention relates to an embedded magnetic component transformer device, and in particular to an embedded magnetic component transformer device with reduced coupling and improved isolation properties.

2. Description of the Related Art

It is known, for example, in US 2011/0108317 A1, to provide low profile transformers and inductors in which the magnetic components are embedded in a cavity in a resin substrate, and the necessary input and output electrical connections for the transformer or inductor are formed on the substrate surface. A printed circuit board (PCB) for a power supply device can then be formed by adding layers of solder resist and copper plating to the top and/or bottom surfaces of the substrate. The necessary electronic components for the device may then be surface mounted on the PCB.

Compared to conventional transformers, an embedded design allows a significantly thinner and more compact device to be built. This is desirable because typically the space available for mounting the transformer device onto a PCB, for example, a motherboard of an electronics device, will be very limited. A transformer component with a smaller footprint will therefore enable more components to be mounted onto the PCB, or enable the overall size of the PCB and therefore the entire device to be reduced.

When reducing the size of the transformer device, the gap between adjacent turns on a transformer winding are likely to be provided more closely together, and the gap between separate windings provided on the transformer will also be reduced. This reduces the ease with which a magnetic field, set up in the transformer during use, can escape from the transformer core and therefore results in a stronger coupling, via the magnetic field, between the separate windings provided on the core. Another consequence of reducing the gap between adjacent turns is an increase in the capacitance existing between adjacent conducting components which include the transformer windings. Such increased coupling between the windings via the magnetic field they generate, and such increased distributed capacitance throughout the transformer, are not desirable properties for a transformer in certain applications.

Furthermore, reducing the transformer size can result in safety considerations, particularly if two separate windings sharing a common transformer core are to handle high voltages. Such a transformer is used in power electronics applications and power converter technology, for example. In this case, the windings must be electrically isolated from one another. A smaller transformer will tend to reduce the distance between electrically isolated windings, meaning that the electrical isolation is less robust against failure by electrical arcing and reducing the maximum voltages that the transformer windings can safely handle.

The electrical isolation can be increased to a safe level by using a multi-layer PCB arrangement with different windings provided on different PCB layers, by providing a cover on the transformer core, or by coating the windings in a conformal coating or other sort of insulating material such as insulating tape. Triple insulated wire can also be used. However, all of these techniques have the disadvantage that the embedded magnetic component transformer device must be made larger to accommodate the extra PCB layers or the thicker insulation on the windings and/or core.

It would be desirable to provide an embedded transformer device having reduced coupling between the coils and improved isolation characteristics, and to provide a method for manufacturing such a device.

SUMMARY OF THE INVENTION

A preferred embodiment of the present invention provides an embedded transformer device including: an insulating substrate including a first side and a second side opposite the first side, and including a cavity therein, the cavity including an inner and an outer periphery; a magnetic core housed in the cavity; a primary winding extending through the insulating substrate and around the first side of the magnetic core; a secondary winding extending through the insulating substrate and around the second side of the magnetic core; and an auxiliary winding extending through the insulating substrate and around the first side of the magnetic core so as not to overlap with the primary winding. Each of the primary, secondary, and auxiliary windings include: upper conductive traces; lower conductive traces; inner conductive connectors extending through the insulating substrate adjacent an inner periphery of the magnetic core, the inner conductive connectors respectively define electrical connections between respective upper conductive traces and respective lower conductive traces; and outer conductive connectors extending through the insulating substrate adjacent an outer periphery of the magnetic core, the outer conductive connectors respectively define electrical connections between respective upper conductive traces and respective lower conductive traces. The inner conductive connectors of the primary winding and of the secondary winding are provided at a constant or substantially constant distance from the inner periphery of the cavity. The inner conductive connectors of the auxiliary winding are provided farther from the inner periphery of the cavity than the inner conductive connectors of the primary and secondary windings, and/or the outer conductive connectors of the auxiliary winding are provided farther from the outer periphery of the cavity than the inner conductive connectors of the primary and secondary windings are from the inner periphery of the cavity.

The first constant or substantially constant distance and the second constant or substantially constant distance may be equal or substantially equal.

The outer conductive connectors of the auxiliary winding may be provided farther from the outer periphery of the cavity than the first constant or substantially constant distance between the inner conductive connectors of the primary winding and the inner periphery of the cavity and farther than the second constant or substantially constant distance between the inner conductive connectors of the secondary winding and the inner periphery of the cavity.

The inner conductive connectors of the primary and secondary windings, when viewed in a direction perpendicular to the first side of the insulating substrate, may be arranged on a circular arc or a substantially circular arc, and the inner conductive connectors of the auxiliary winding may be enclosed within a circumference of a circle corresponding to the circular arc or substantially circular arc.

The inner conductive connector of the auxiliary winding closest to the primary winding may be provided farther from the inner periphery of the cavity compared to the inner conductive connector of the auxiliary winding farthest from the primary winding.

At least one of the upper or lower conductive traces may be curved, or may include a plurality of straight sections angled with respect to one another.

A conductive element may be provided in the gap between the two windings.

The conductive element may at least partially shield an electric field on one of the primary and auxiliary windings from an electric field on the other.

The conductive element may be provided at least between the inner conductive connectors of the primary winding and the inner conductive connectors of the auxiliary winding.

The conductive element may include a conductive plane.

The conductive plane may be parallel or substantially parallel to the first and second surfaces of the substrate.

The embedded transformer device may include a first printed circuit board located on the first side of the insulating substrate, the first printed circuit board including the upper conductive traces, and/or a second printed board located on the second side of the insulating substrate, the second printed circuit board including the lower conductive traces.

The conductive element may be located on the first and/or second printed circuit boards.

The conductive element may include a ground plane on the first and/or second surface of the first and/or second printed circuit boards.

The ground plane may extend over substantially all of the surface of the first and/or second printed circuit boards that is not occupied by connections to the conductive vias or the conducting traces.

The conductive element may be arranged orthogonal or substantially orthogonal to the first and second surfaces of the substrate.

The conductive element may extend from the first side of the insulating substrate to the second side of the insulating substrate.

The conductive element arranged orthogonal or substantially orthogonal to the first and second surfaces of the substrate may include a conductive plane.

The conductive element may include one or more conductive vias or pins provided in the gap.

The conductive element may be held at a ground potential when the device is in operation.

A preferred embodiment of the present invention provides a power converter including the embedded transformer device.

Preferred embodiments of the present invention include methods of manufacturing an embedded magnetic component device.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention include an embedded magnetic component transformer device including primary, secondary, and auxiliary windings extending around a magnetic core embedded in a substrate. The embedded magnetic component transformer device may advantageously be used as a portion of a switching power electronic device. Preferred embodiments of the present invention are illustrated in FIGS. 2 to 6 which will be discussed in detail below.

For ease of understanding, an example method of manufacturing an embedded magnetic component transformer device will now be described with reference to FIGS. 1A to 1F. Techniques for manufacturing an embedded magnetic component transformer device are described in UK patent applications GB 1414469.5 and GB 1414468.7 filed by the present applicant, the entire contents of which are incorporated herein by reference.

Figure 1A:
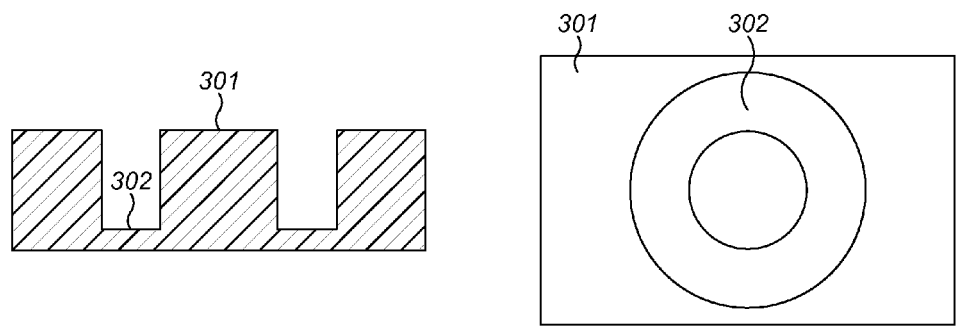
FIGS. 1A to 1G illustrate a technique for manufacturing preferred embodiments of the present invention.

In a first step of the method, illustrated in FIG. 1A, a circular annulus or cavity 302 that houses a magnetic core is routed in an insulating substrate 301. In this example, the insulating substrate is formed of a resin material, such as FR4. FR4 is a composite 'pre-preg' material composed of woven fiberglass cloth impregnated with an epoxy resin binder. The resin is pre-dried, but not hardened, so that when it is heated, it flows and acts as an adhesive for the fiberglass material. FR4 has been found to have favorable thermal and insulation properties.

Figure 1B:
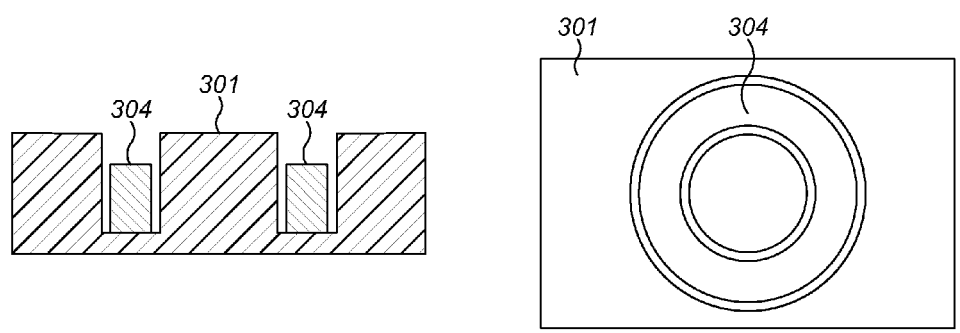

As shown in FIG. 1B, a circular magnetic core 304 is then installed in the cavity 302. The cavity 302 may be slightly larger than the magnetic core 304, so that an air gap may exist around the magnetic core 304. The magnetic core 304 may be installed in the cavity manually or by a surface mounting device such as a pick and place machine.

Figure 1C:
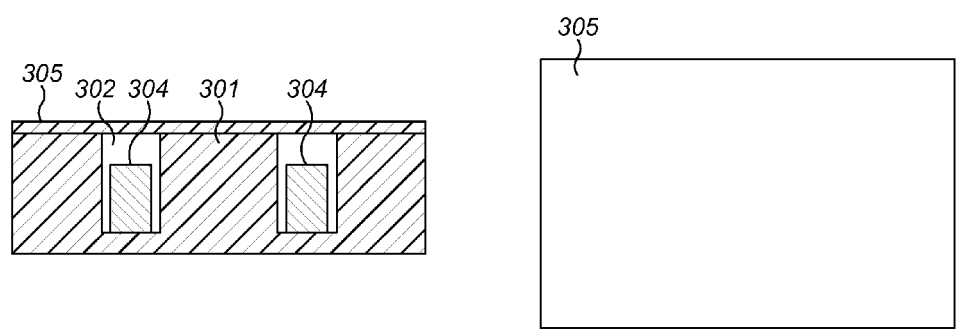

In the next step, illustrated in FIG. 1C, a first insulating layer or cover layer 305 is secured or laminated on the insulating substrate 301 to cover the cavity 302 and the magnetic core 304. Preferably, the cover layer 305 is formed of the same material as the insulating substrate 301 as this aids bonding between the top surface of the insulating substrate 301 and the lower surface of the cover layer 305. The cover layer 305 may therefore also be formed of a material such as FR4, laminated onto the insulating substrate 301. Lamination may be via adhesive or via heat activated bonding between layers of pre-preg material. In other preferred embodiments of the present invention, other materials may be used for the layer 305.

Figure 1D:
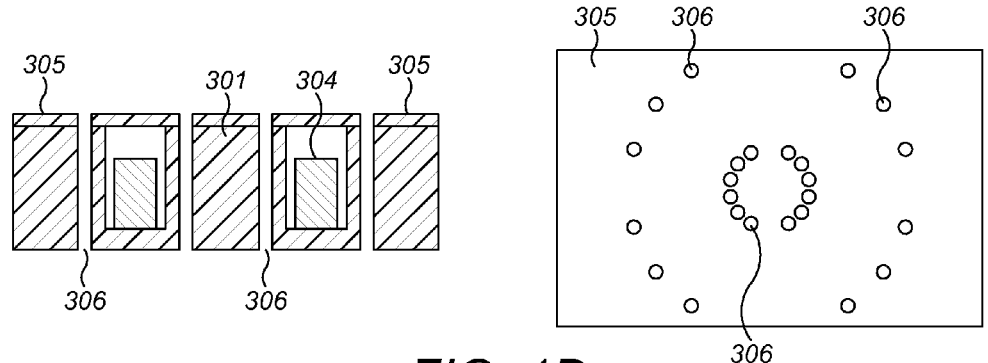

In the next step illustrated in FIG. 1D, though-holes 306 extend through the insulating substrate 301 and the cover layer 305. The through holes 306 are formed at suitable locations to define the primary and secondary coil conductor windings of an embedded transformer. The exact arrangement of the through-holes 306 will be described later, but a general pattern of through-holes including two arcs corresponding to the inner and outer circular circumferences of the cavity 302 is shown in FIG. 1D. As is known in the art, the through-holes 306 may be formed by drilling, or any other suitable technique.

Figure 1E:
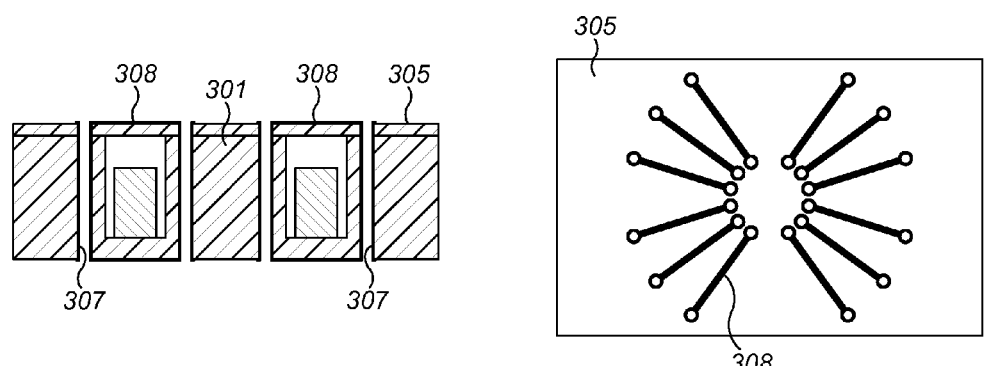

As shown in FIG. 1E, the though-holes 306 are then plated to define conductive via holes 307 that extend from the top surface of the cover layer 305 to the bottom surface of the substrate 301. Conductive or metallic traces 308 are added to the top surface of the cover layer 305 to define an upper winding layer connecting the respective conductive via holes 307, and to provide a portion of the windings of the transformer. The upper winding layer is illustrated by way of example in the right hand side of FIG. 1E. The metallic traces 308 and the plating for the conductive via holes 307 are usually formed from copper, and may be formed in any suitable way, such as by adding a copper conductor layer to the outer surfaces of the layer 305 which is then etched to define the necessary patterns, deposition of the copper onto the surface, and so on.

Metallic traces 308 are also formed on the bottom surface of the insulating substrate 301 to define a lower winding layer also connecting the respective conductive via holes 307 to define a portion the windings of the transformer. The upper and lower winding layers 308 and the via holes 307 together define the windings of the transformer. In this illustration, only primary and secondary side windings are illustrated.

Figure 1F:
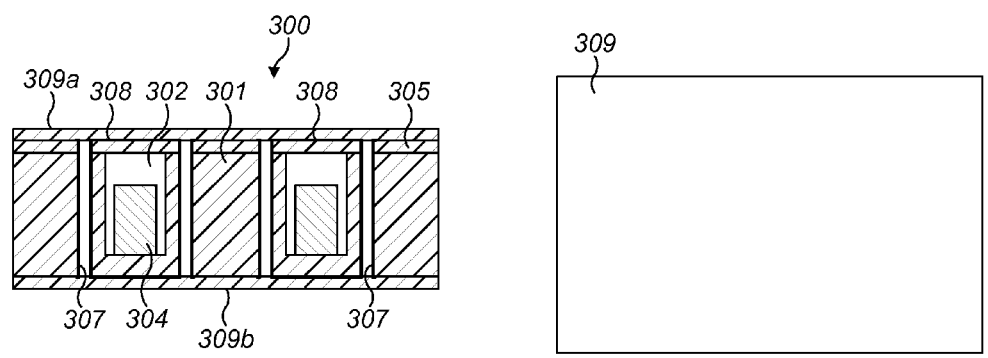
Figure 1G:
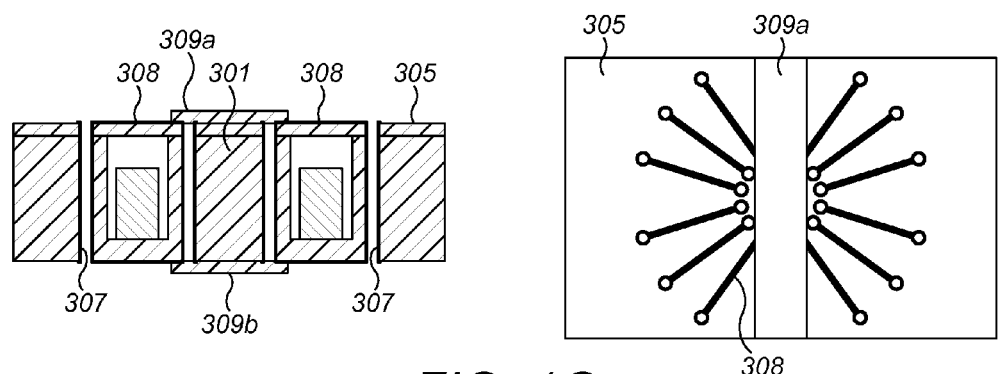

As shown in FIGS. 1F and 1G, optional second and third insulating layers 309 may be formed on the top and bottom surfaces of the structure shown in FIG. 1E to define first and second isolation barriers. The layers may be secured in place by lamination or any other suitable technique.

In FIG. 1F, the bottom surface of the second insulating layer or first isolation barrier 309a adheres to the top surface of the cover layer 305 and covers the terminal lines 308 of the upper winding layer. The top surface of the third insulating layer or second isolation barrier 309b on the other hand adheres to the bottom surface of the substrate 301 and covers the terminal lines 308 of the lower winding layer. Advantageously, the second and third insulating layers, i.e., first isolation barrier 309a and second isolation barrier 309b, may also be formed of FR4, and laminated onto the insulating substrate 301 and cover layer 305 using the same process as for the cover layer 305.

Through-holes and via conductors extend through the second and third insulating layers, i.e., first isolation barrier 309a and second isolation barrier 309b, in order to connect to the input and output terminals of the primary and secondary transformer windings (not shown). Where the conductive via holes through the second and third insulating layers, i.e., first isolation barrier 309a and second isolation barrier 309b, are located apart from the conductive via holes 307 through the substrate 301 and the cover layer 305, a metallic trace is preferably provided on the upper winding layer connecting the input and output vias to the first and last via in each of the primary and secondary windings. Where the input and output vias are formed in overlapping positions, then conductive or metallic caps could be added to the first and last via in each of the primary and secondary windings.

In FIG. 1F, the first and second isolation barriers 309a and 309b define a solid bonded joint with the adjacent layers, either cover layer 305 or substrate 301, on which the upper or lower winding layers 308 of the transformer are located. The first and second isolation barriers 309a and 309b therefore provide a solid insulated boundary along the surfaces of the embedded magnetic component device, greatly reducing the chance of arcing or breakdown, and allowing the isolation spacing between the primary and secondary side windings to be greatly reduced.

The first and second isolation barriers 309a and 309b are formed on the substrate 301 and cover layer 305 without any air gap between the layers. If there is an air gap in the device, such as above or below the winding layers, then there would be a risk of arcing and failure of the device. The first and second isolation barriers 309a and 309b, the cover layer 305 and the substrate 301, therefore define a solid block of insulating material.

In FIG. 1F, the first and second isolation barriers 309a and 309b are illustrated as covering the whole of the cover layer 305 and the bottom surface of the substrate 301 of the embedded magnetic component device 300. In the alternative preferred embodiment of FIG. 1G, however, it is sufficient if the first and second isolation barriers 309a and 309b are applied to the cover layer 305 and the bottom of the substrate 301 so that they at least cover only the portion of the surface of the cover layer 305 and substrate 301 surface between the primary and secondary windings, where the primary and secondary windings are closest. As shown, the first and second isolation barriers 309a and 309b may then be provided as a long strip of insulating material placed on the surface parallel or substantially parallel to the shorter edge of the device and covering at least the isolation region between the primary and secondary side windings. In alternative preferred embodiments, as the primary and secondary side windings follow the arc of the magnetic core 304 around which they are wound, it may be sufficient to place the isolation barriers 309a and 309b only where the primary and secondary side windings are closest, which in this case is at the 12 o'clock and 6 o'clock positions. As noted above, however, a full layer of the first and second isolation barriers 309a and 309b covering the entire surface of the embedded component device can be advantageous as it provides locations for further mounting of components on the surface of the device.

A first preferred embodiment of an embedded magnetic component transformer device will now be described with reference to FIG. 2. Such an embedded transformer device may be constructed according to the steps described in relation to FIGS. 1A to 1F.

Figure 2:
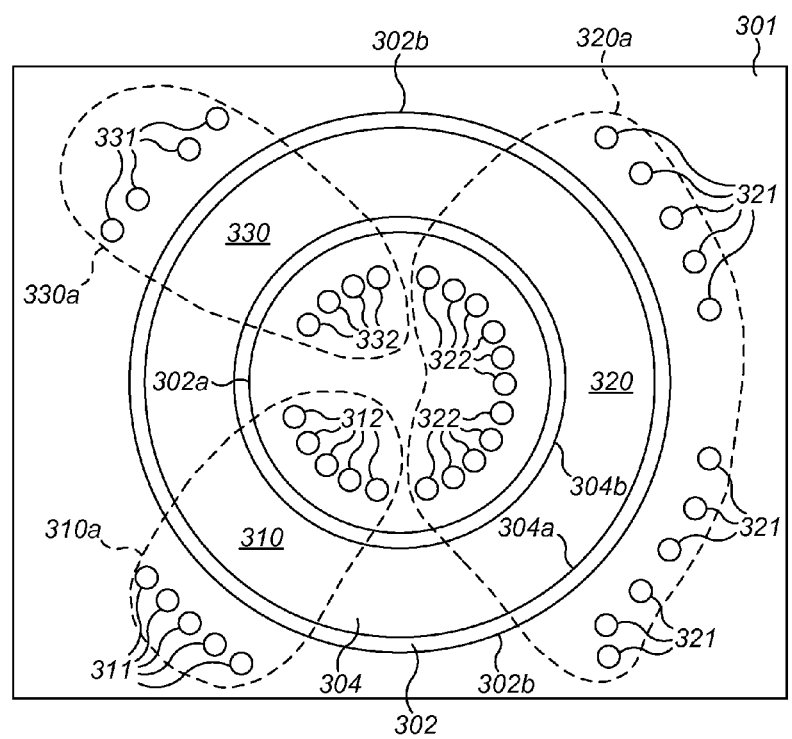
FIG. 2 illustrates a top down view of the conductive vias, a cavity, and a magnetic core.

As shown in FIG. 2, the embedded magnetic component transformer device includes a primary winding in region 310 of the substrate, a secondary winding in the region 320 of the substrate, and an auxiliary winding in the region 330 of the substrate. As will be discussed later, the auxiliary winding may include one or more auxiliary windings. The primary, secondary and auxiliary windings are located around a common magnetic transformer core 304 with an outer periphery 304a and an inner periphery 304b provided in the cavity 302. For the purposes of illustration the regions labelled 310, 320, 330 are respectively bounded by outlines 310a, 320a, 330a. As shown in FIG. 2, the regions 310, 320 and 330 are separate from one another and occupy discrete areas of the substrate. The windings do not therefore overlap with one another. The central island defined by the cavity 302 may be called the isolation region as it is designed to provide some isolation between the primary and secondary sides of the transformer.

Figure 3:
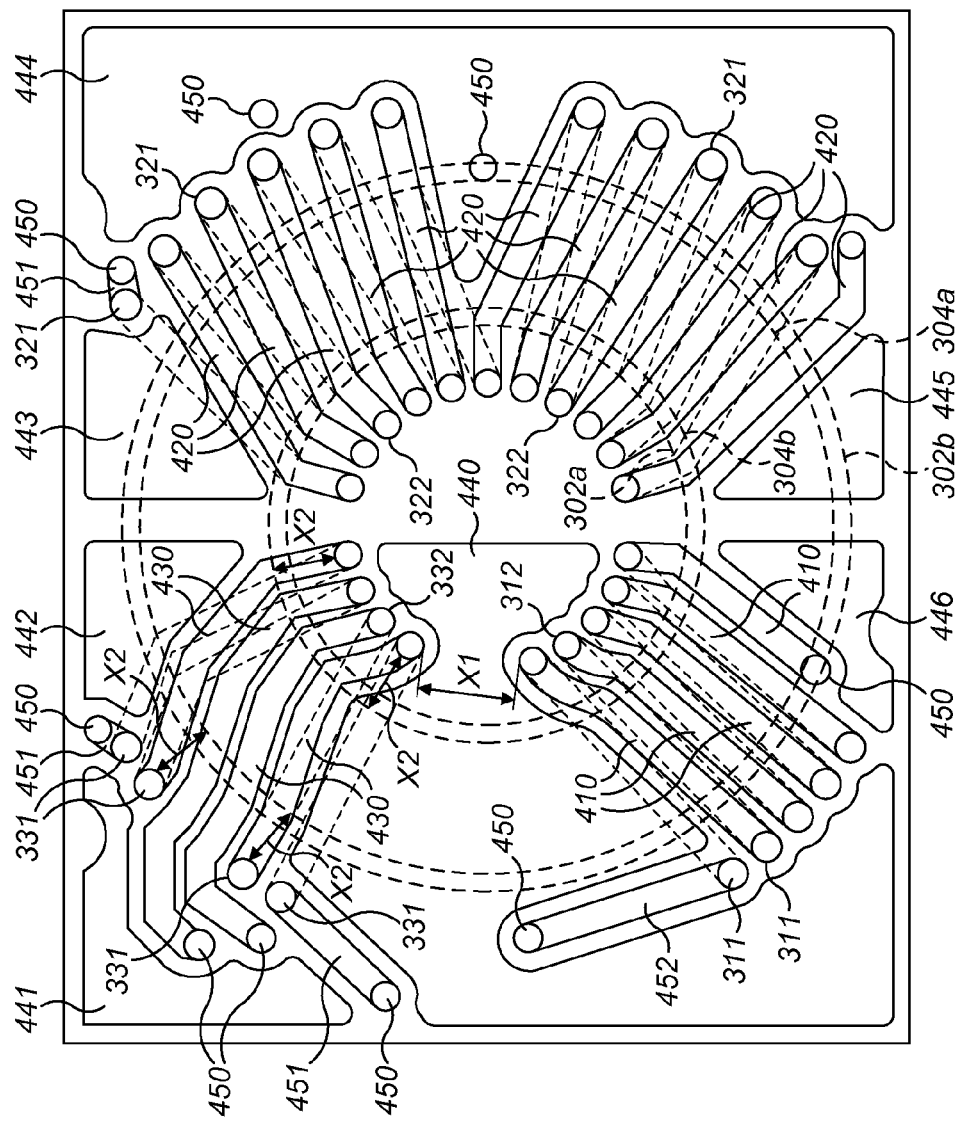
FIG. 3 illustrates a top down view of a printed circuit board providing conductive traces between the conductive vias.
Figure 4:
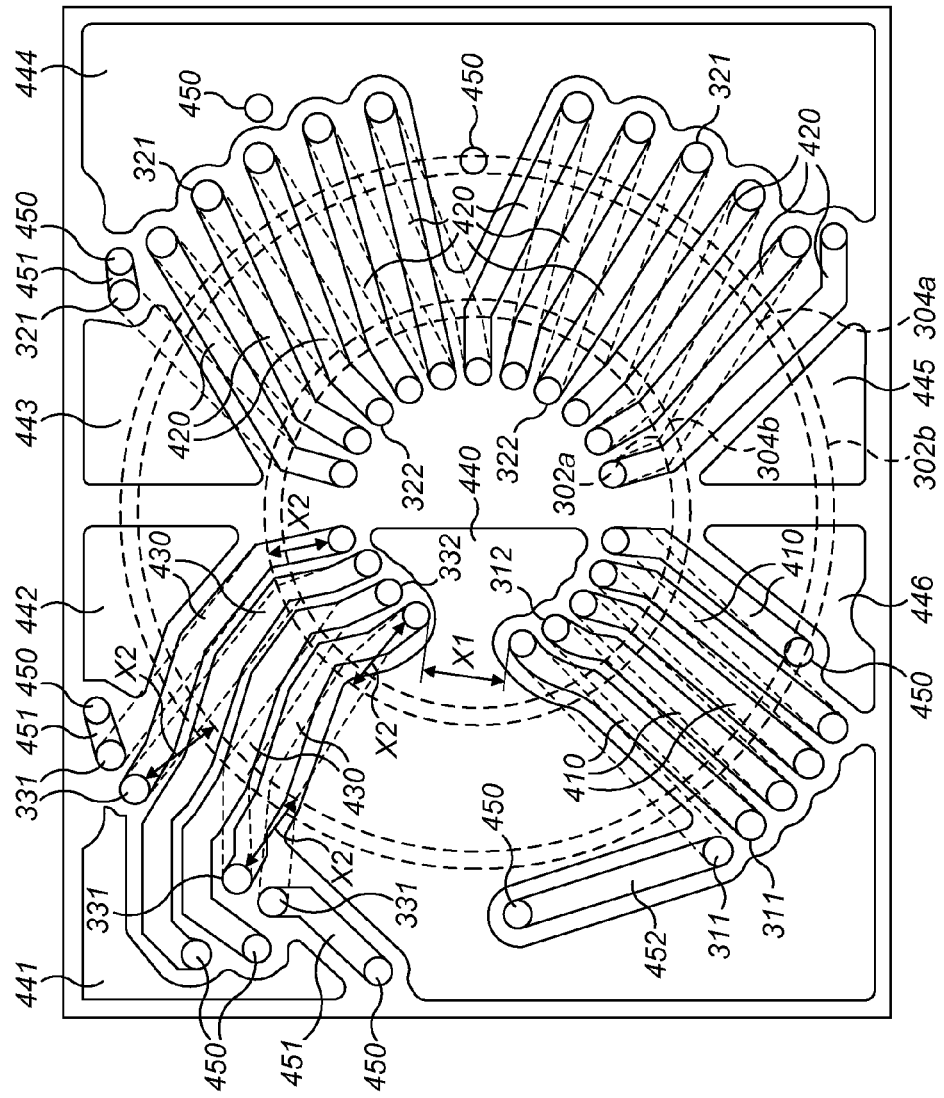
FIG. 4 illustrates a top down view of another printed circuit board.

The primary, secondary, and auxiliary windings of the transformer are defined by upper and lower conductive traces formed on the top and bottom of the resin substrate (not visible in FIG. 2), connected by a plurality of respective conductive connectors extending through the substrate from one side to the other. The conductive connectors may be defined by plated via holes as described above, or maybe conductive pins or filaments. In FIGS. 2, 3, and 4 the conductive connectors are illustrated as plated via holes.

The arrangement of the via holes defining the primary, secondary, and auxiliary windings is important because the spacing between the via holes themselves, together with the spacing between the via holes and the magnetic core, affects both the electrical isolation obtainable between the transformer windings, and the degree of coupling between the transformer windings.

In practice, the size of the embedded magnetic component transformer device limits the extent of the spacing available between the via holes. Nevertheless, it is often desirable to maximize the spacing between the vias because this leads to better isolation performance. Large spacings also tend to increase the leakage inductance of the transformer, thereby weakly coupling the windings together. This is often desirable for reasons explained below. The via hole spacing therefore provides improvements in the isolation characteristics and leakage inductance of the windings, while still allowing a compact transformer device to be realized.

The structure of the separate windings will now be described in more detail.

The primary winding of the transformer, located within region 310, includes primary outer conductive vias 311, primary inner conductive vias 312, and conductive traces linking the conductive vias (not shown in FIG. 2). The primary outer conductive vias 311 are arranged along the circular portion of the outer edge 302b of the cavity 302, and are arranged in one row. The primary inner conductive vias 312 are also arranged in a single row. In other preferred embodiments, the primary inner conductive vias 312 can be arranged in a plurality of rows, for example, two rows.

The primary transformer winding may include the same number of inner and outer conductive vias defining the complete primary winding. This ensures that the terminals at either end of the primary winding are on the same side, for example, on the top or on the bottom, of the insulating substrate 301. Alternatively, it is also possible to form the primary winding with an arrangement where there is one more inner conductive via than there are outer conductive vias, or where there is one fewer inner conductive vias than there are outer conductive vias. Such an arrangement means that the terminals at either end of the primary winding are on opposing sides, with one on top of the substrate 301 and one on the bottom, of the substrate 301. Both of these alternatives, where the terminals are on the same or opposing sides, may be desirable depending on the location of the input and output circuitry to which the terminals are to be connected. The secondary and auxiliary windings may also be similarly arranged.

As shown in FIG. 2, the five primary inner conductive vias 312 and the five primary outer conductive vias 311 mean that the primary winding includes five complete turns when the conductive vias are connected by the conducting traces. In this example, the primary winding is suitable for use in a Royer half bridge input configuration, as will be described later.

The secondary winding of the transformer includes secondary outer conductive vias 321, secondary inner conductive vias 322, and conductive traces linking the conductive vias (not shown in FIG. 2). The secondary outer conductive vias 321 are arranged in a single row along the circular portion of the outer edge 302b of the cavity 302, and are split into two groups. The secondary inner conductive vias 322 are also arranged in a single row. In the preferred embodiment shown in FIG. 2, the secondary inner conductive vias 322 preferably include eleven conductive vias, and the secondary outer conductive vias 321 also preferably include eleven conductive vias, split into one group of five conductive vias, and one group of six conductive vias, for example. Therefore, the secondary winding includes eleven turns when the conductive vias are connected by the conducting traces, for example. Other configurations are also possible.

The auxiliary winding of the transformer, located within region 330 on a section of the magnetic core 304 not overlapping with the primary winding 310 or the secondary winding 320, includes auxiliary outer conductive vias 331, auxiliary inner conductive vias 332, and conductive traces linking the conductive vias (not shown in FIG. 2). The auxiliary outer conductive vias 331 and the auxiliary inner conductive vias 332 are arranged in a single row along the respective outer 302b and inner edge 302a of the cavity 302.

Four auxiliary inner conductive vias 332, and four auxiliary outer conductive vias 331 are preferably provided, and the auxiliary windings may include two separate feedback windings, for example, as will be discussed later. In some preferred embodiments, the auxiliary winding includes one or more feedback windings, the voltage across it being fed back to the input circuitry being used to energize the primary winding. Alternatively, the auxiliary winding may be a control winding used to control some other aspect of the input and/or output circuitry. Other uses of the auxiliary winding could be to provide a housekeeping supply or to control a synchronous rectifier. More than one auxiliary winding could be provided, allowing more than one of these functions to be carried out. Other uses for the auxiliary windings are also possible. If multiple auxiliary windings are provided, they may also be located on the input side, the output side, or both.

When the transformer is in operation, the ratio of the voltages provided across the primary, secondary, and auxiliary windings is proportional to the number of turns in each respective winding. Therefore, the number of turns in each winding can be chosen, by adding or removing conductive vias and conductive traces, in order to obtain desirable voltage ratios between the windings. This is particularly important in, for example, isolated DC to DC converters where strict requirements as to the output voltage will typically need to be met.

FIG. 3 shows a conductive trace pattern for a PCB suitable for mounting on the top surface of the insulating substrate 301 shown in FIG. 2. The arrangement of the conductive vias is therefore identical to that of FIG. 2. Some components have not however been labelled in FIG. 3 and the subsequent figures for the sake of clarity. It should nevertheless be understood that all of the components that were labelled and described in relation to FIG. 2 also apply to FIG. 3 and the subsequent figures. Note that the conductive vias are shown as circles at either end of the conducting traces. Various other conductive vias or pads not shown in FIG. 2, and conductive traces linking them, are provided on the PCB. These are generally indicated by the reference numeral 450 for the conductive vias or pads, and by the reference numeral 451 for the conductive traces. They provide input and output connections to the various windings and in turn allow these windings to be connected to other components mounted to the PCB. Thus, they can be considered to be a portion of the respective primary, secondary, or auxiliary windings. In the region of the substrate containing the auxiliary windings, two auxiliary coils are defined by respective pairs of input and output pads 450 and traces 451.

The primary inner conductive vias 312 are connected to the primary outer conductive vias 311 by the conductive traces 410. The secondary inner conductive vias 322 are connected to the secondary outer conductive vias 321 by the conductive traces 420. Similarly, the auxiliary inner conductive vias 332 are connected to the auxiliary outer conductive vias 331 by the conductive traces 430. The edges 302a and 302b of the cavity 302 are also indicated, as are the edges 304a and 304b of the magnetic core 304. These components need not be visible through the PCB but are shown in FIG. 3 for the sake of clarity. In FIG. 3 (and FIGS. 4 and 5 discussed below), the traces 410, 420, 430 are shown in bold lines where they appear on the surface of the substrate in view. The traces on the opposite side of the substrate are indicated with dashed lines so that the construction of the windings can be more readily understood.

The conductive traces 430 of the auxiliary winding are shaped so that those connecting to outer conductive vias 331 located farther from the outer periphery 302b of the cavity 302 wrap around those outer conductive vias 331 located closer to the outer periphery 302b of the cavity 302. For example, the conductive via labelled 331 in FIG. 3 is partially enclosed, in plan view, by an adjacent conductive trace. In other words, the conductive traces may be curved, or may be defined by a series of straight sections which are angled with respect to one another, as they link the inner conductive vias 332 to the outer conductive vias 331. Conductive traces of this shape may also be used on the primary and/or secondary windings.

The conductive traces 410 of the primary winding are arranged so as to diverge away from the conductive traces 430 of the auxiliary winding in a direction from the center of the magnetic core 302 to the outer edge of the substrate 301. Therefore the minimum distance between the primary and auxiliary windings is given by the distance X1, that is the distance between the closest inner conductive vias of the primary and auxiliary coils. A conductive element 440 is provided on the PCB in the gap X1. In this preferred embodiment, the conductive element 440 preferably is a copper plane. Copper planes 441 to 446 are also provided on the PCB. As shown in FIG. 3, the copper planes 440 to 446 may between them extend over substantially the whole of the PCB in such a way as not to overlap with any of the conductive traces or via holes. The copper planes 440 to 446 may conveniently be configured as ground planes.

The four auxiliary inner conductive vias 332 are located in a row with the same distance or gap between each other, while the four auxiliary outer conductive vias 331 grouped in twos in which the gap between the two grouped auxiliary outer conductive vias 331 in the group is smaller than the gap between the groups of auxiliary outer conductive vias 331. There are input and output pads 450 and traces 451 between the groups of auxiliary outer conductive vias 331. This arrangement is suitable for the two drive transistors TR1 and TR2 in the Royer circuit discussed below.

The input and output pads 450 of the auxiliary winding are not aligned in line with the auxiliary outer conductive vias 331, and the input and output pads 450 are located farther to an outer side than the auxiliary outer conductive vias 331. This arrangement is also suitable for the two drive transistors TR1 and TR2 in the Royer circuit discussed below.

The input and output pads 450 and traces 451 of the primary and auxiliary windings extend toward one another. Trace 452 connected between pad 450 and the uppermost primary outer conductive via 311 allows the primary and auxiliary windings to be separated by a larger distance, increasing the leakage inductance and decreasing the coupling. One end of the trace 452 can be connected to the node 610 between the transistors TR1 and TR2, as discussed below.

The traces 430 of the auxiliary winding can be slightly bent, in contrast to traces 410 and 420 of the primary and secondary windings. A bent trace increases the spacing between the windings compared to a straight trace, decreasing the coupling between the windings.

A PCB is also provided for fixing to the conductive vias on the bottom surface of the insulating substrate 301. The arrangement of conductive vias and conductive traces will be similar to the PCB shown in FIG. 3, although it may differ in respect of the extra conductive vias 450 and conductive traces 451 used to connect the transformer windings to the other electrical components.

The use of PCBs in providing the conductive traces is advantageous because the production process is repeatable to a very high degree of accuracy. This ensures that the performance of the embedded transformer does not vary from one device to another.

It is desirable for the windings of the transformer to be weakly coupled together, meaning there is leakage inductance resulting from magnetic flux escaping from within the magnetic core, and there is low distributed capacitance between adjacent turns in the conductor windings. It is particularly desirable for the embedded transformer to be weakly coupled when the transformer is used in a self-oscillating converter circuit. This is because too strong a coupling between the feedback winding and the other windings may cause the converter circuitry to enter a high frequency oscillation mode during switch-on, preventing the converter from starting and leading to the transformer malfunctioning.

One way of manufacturing a weakly coupled embedded transformer device is therefore to arrange the windings in such a way that there is a high leakage inductance. The leakage inductance can be increased by: (i) increasing the gap between the windings; and (ii) increasing the distance between pairs of connected conducting vias. Staggering the conductive vias by providing them on more than one row allows room for an increase in the gap between the windings, thereby contributing to (i), and also increases the gap between some of the inner and outer connected conductive vias, thereby contributing to (ii).

Increasing the gap between the primary and auxiliary windings increases the amount of magnetic flux that does not couple through the windings, thereby increasing the leakage inductance. The leakage inductance can also be increased by increasing the gap between the primary and secondary windings, or between the secondary and auxiliary windings. A combination of any or all of these can be used.

Increasing the distance between pairs of conducting vias that are, in the complete embedded transformer, connected by conducting traces leads to more space between the magnetic core and the windings, with the result that the magnetic flux can more easily escape. Equivalently, the distance between the magnetic core and the transformer windings can be increased in order to obtain the same effect. This distance X2 is indicated with respect to the auxiliary winding in FIG. 3.

Staggering the conductive vias by providing them on more than one row can further increase the leakage inductance compared to the case where all of the conductive vias are provided in a single row. This is because such an arrangement allows more space between the conductive vias defining the outer row, making it easier for the magnetic flux to escape. However, it may not be practical to provide the conductive vias on more than one row, particularly if there are space constraints limiting the number of rows of conductive vias that can be drilled through the insulating substrate. Similarly, the overall size of the embedded transformer device limits the extent to which the windings can be separated leaving a gap through which the magnetic flux can escape from the magnetic core, and also limits the distance by which one can separate the conductive vias from the magnetic core.

In view of the limitations upon achievable leakage inductance imposed by including an embedded conductor that is small in size, it is also desirable to reduce the coupling between the transformer windings by reducing the distributed capacitance between the windings. In the preferred embodiment shown in FIG. 3, this is achieved by providing the planar conductor 440 in the gap between the auxiliary winding and primary winding. Providing the conductive element 440 in the gap between these windings at least partially shields one winding from another as it reduces the size of the intervening electric field that can be produced between the uppermost conductive trace 410 of the primary winding and the lowermost conductive trace 430 of the auxiliary winding. This is because the electric field between them cannot penetrate the copper plane and therefore the only electric field that can pass from one trace to the other must bypass the copper plane entirely. This reduces the energy that can be stored in an electric field across the gap, and thereby reduces the distributed capacitance between the two traces. In other preferred embodiments, a planar conductor is provided between the auxiliary and secondary windings, or between the primary and secondary windings. More than one of these positions for the planar conductor may be used.

In the preferred embodiment described above, the conductive element 440 preferably is a copper plane provided parallel or substantially parallel to the first and second surfaces of the substrate. In other preferred embodiments, other configurations of the conductive element 440 may be used, as long as a sufficient shielding effect between the primary and auxiliary windings is provided. For example, the conductive element 440 may be arranged in a direction orthogonal or substantially orthogonal to the first and second surfaces of the substrate, either embedded in the substrate or passing fully from one surface to another. In such configurations, the conductive element 440 may be a conductive plane, or one or more conductive vias, pins, or filaments provided in the gap. Where one or more conductive vias, pins, or filaments are provided in the gap, these may be conveniently arranged in a row, mesh, framework, or other lattice-type arrangement.

Another preferred embodiment is shown in FIG. 4, in which the distance X2, defined as the minimum distance between the auxiliary outer 331 or inner 332 conductive vias and the magnetic core 304, is increased relative to the preferred embodiment of FIG. 3 in order to maximize the leakage inductance through this portion of the transformer. The position of the auxiliary inner conductive vias 332 deviates slightly from a circular arc in order to achieve this increase in distance. As illustrated in FIG. 4, the distance X2 may be increased and a copper plane 440 may be provided, these two features act in tandem to reduce the coupling between the transformer windings.

As shown in FIG. 3, the inner conductive vias 332 of the auxiliary electrical winding are provided farther from the inner periphery 302a of the cavity 302 than the inner conductive vias 312, 322 of the primary and secondary electrical windings are from the inner periphery 302a of the cavity 302. The distance from the inner conductive vias 332 to the inner periphery 302a of the cavity 302 is therefore greater than the minimum of the distances between the primary inner conductive vias 312 and the secondary inner conductive vias 322 and the inner periphery 302a of the cavity 302.

Alternatively or in addition, the outer conductive vias 331 of the auxiliary electrical winding are provided farther from the outer periphery 302b of the cavity 302 than the inner conductive vias 312, 332 of the primary and secondary electrical windings are from the inner periphery 302a of the cavity 302. The distance from the outer conductive vias 331 to the outer periphery 302b of the cavity 302 is therefore greater than the minimum of the distances between the primary inner conductive vias 312 and the secondary inner conductive vias 322 and the inner periphery 302a of the cavity 302.

As illustrated in FIG. 4, the distance X2 may be increased and a copper plane 440 may be provided, these two features acting in tandem to reduce the coupling between the transformer windings. In other preferred embodiments, only one of these features may be provided, for example, only a copper plane without an increased distance between the conductive vias and the magnetic core, as in FIG. 3, or only an increased distance between the conductive vias and the magnetic core without a copper plane.

Figure 5:
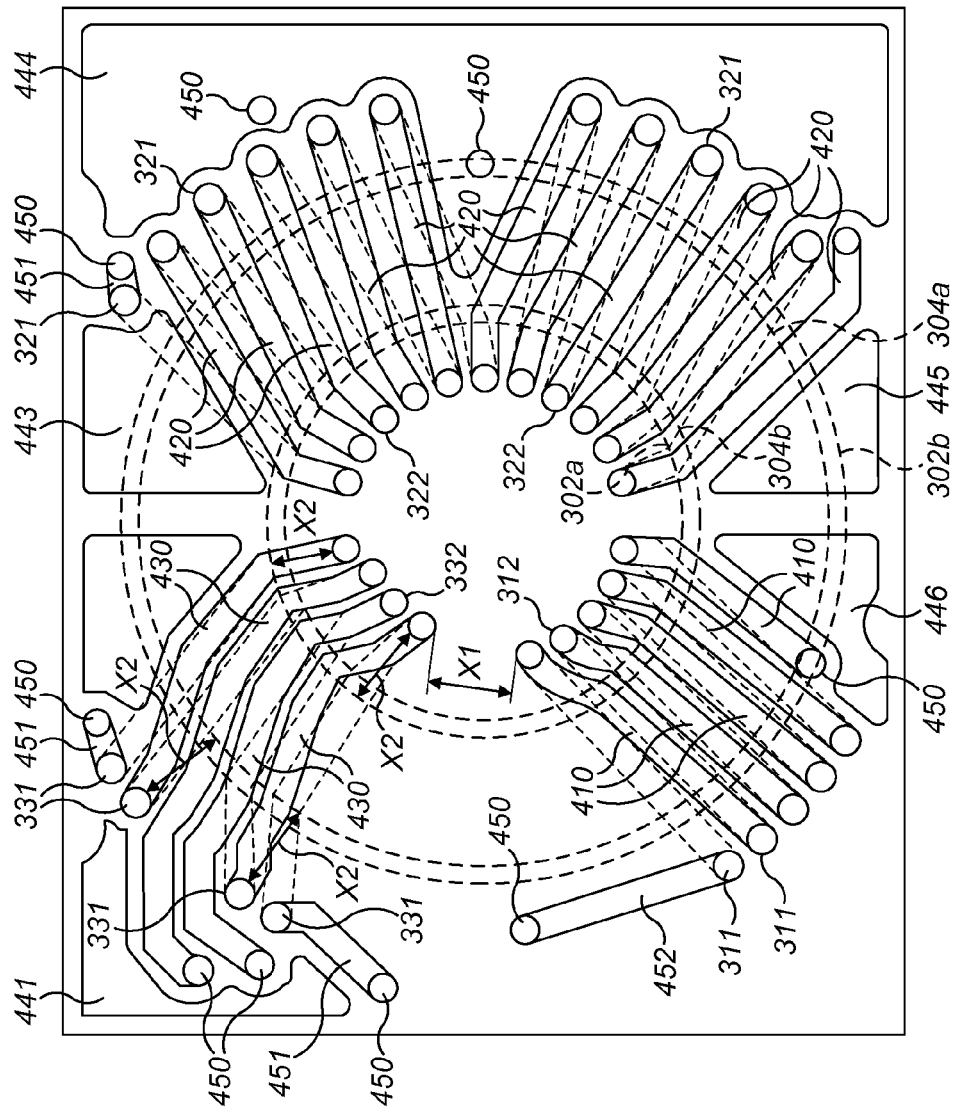
FIG. 5 illustrates a top down view of a another printed circuit board.

This latter case is illustrated in FIG. 5. This is similar to the preferred embodiment of FIG. 4, except that the conductive plane 440 is not present. The conductive plane 440 may be missing from either or both of the PCBs at the upper and lower surfaces of the insulating substrate. In this case, the distributed capacitance between the windings is not decreased, and therefore the desired weak coupling between the windings originates only from the gap X1 between the primary and auxiliary windings, and the extended distance X2 between the auxiliary inner conductive vias and the magnetic core, and between the auxiliary outer conductive vias and the magnetic core.

Furthermore, although increasing the distance X2 has been described in relation to increasing the leakage inductance through the auxiliary winding, it is also possible to increase the leakage inductance through the primary winding or secondary winding by increasing the corresponding distances between the conductive vias in those windings and the magnetic core. A combination of any or all of these can also be used.

Likewise, although increasing the distance X1 has been described in relation to increasing the leakage inductance through between the primary winding and the auxiliary winding, it is also possible to increase the leakage inductance between the primary winding and secondary winding, or between the secondary winding and auxiliary winding, by increasing the corresponding distances between the conductive vias of those windings. A combination of any or all of these can also be used.

The embedded magnetic component device described above with reference to FIGS. 2 to 5 has particular application to Royer half bridge circuit configuration. Such an arrangement is illustrated schematically by the circuit diagram of FIG. 6.

The circuit takes a DC input between input terminals +V and GND, with the GND terminal being held a ground potential. The transformer TX1 is defined by an embedded transformer of the previously described preferred embodiments, and includes a primary winding TX1(P) defined between nodes 610 and 614, a secondary winding TX1(S) defined between nodes 620 and 624, and two feedback windings TX1(F1) and TX1(F2) defined between nodes 630 and 632, and 634 and 636, respectively.

Two transistors TR1 and TR2 are provided to switch an energizing voltage across the primary winding 611, TX1(P) in alternate directions. The transistors TR1 and TR2 are shown as preferably an npn-type but other types are possible. High power switching transistors, for example MOSFETs (metal oxide field effect transistors) are suitable.

The emitter of transistor TR1 and the collector of transistor TR2 are connected to a first end of the primary winding at node 610. The collector of transistor TR1 is connected to the positive input at node 604. The emitter of transistor TR2 is connected to node 603 which is held at ground potential.

A capacitive divider defined by capacitors C2 and C3 is connected between nodes 604 and 603. The midpoint of the capacitive divider defined by capacitors C2 and C3 is connected to a second end of the primary winding at node 614.

Each of the feedback coils TX1(F1) and TX1(F2) drives one of the bases of the transistors TR1 and TR2. First node 630 of the first feedback winding TX(F1) is connected to the base of transistor TR1 by resistor R3 and capacitor C4 via node 640. A first node 634 of the second feedback winding TX1(F2) is connected to the base of transistor TR2 by resistor R4 and capacitor C1 via node 644.

The second node of the first feedback winding TX(F1) is connected to the center node 642, while the second node of the second feedback winding TX(F2) is connected to the ground terminal 603. Diodes D1 and D2 are connected in parallel with the first TX1(F1) and second TX1(F2) feedback windings, connected between nodes 642 and 640, and 603 and 644, respectively.

Resistors R1 and R2 are connected to supply a base current to transistors TR1 and TR2, respectively. Node 604 is connected to the first terminal of resistor R1, and the second terminal of resistor R1 is connected to node 640. Node 642 is connected to the first terminal of resistor R2, and the second terminal of resistor R2 is connected to node 644.

The circuit oscillates between energizing the winding 611 with one polarity, and then the other. When winding 611 is energized by transistor TR1 conducting, the increasing magnetic flux passing through the core of transformer TX1(P) induces a voltage across the feedback windings 631 and 633. The induced voltage across feedback winding 631 is of the correct polarity to apply a voltage to the base terminal of transistor TR1 in order to keep transistor TR1 switched on. A positive feedback arrangement is thereby achieved, with TR1 being switched on and TR2 being switched off. Eventually the magnetic field within the core saturates and the rate of change of magnetic flux within it drops to zero. The voltage across the primary winding 611, and therefore the current flowing through it, also drops to zero. The feedback windings 631 and 633 react to this change, and an induced voltage, of reverse polarity, is set up across them. This has the effect of switching on transistor TR2 and switching off transistor TR1, thereby energizing the winding 611 in the other direction. Again, positive feedback is produced such that the voltage applied to the base of transistor TR2 by the feedback winding 633 maintains transistor TR2 in a switched on state, while keeping transistor TR1 in a switched off state. Following this, the magnetic field within the core saturates and the circuit returns to energizing the winding 611 as first described. This oscillatory behavior, alternating the energizing of the primary windings 611, continues indefinitely as long as input power is provided.

On the output side of the transformer TX1, secondary transformer winding TX1(S) includes a coil 621 connected between nodes 620 and 624. Transistors TR3 and TR4 are connected with their gate and drain terminals connected across the secondary transformer winding TX1(S) in opposite configuration. Thus, transistor TR3 has its gate connected to node 624 and its drain coupled to node 620, and transistor TR4 has its gate connected to node 620 and its drain connected to node 624.

A diode D3 includes one terminal connected to node 620 and the other connected to node 606, and is biased in a direction towards the node 606. A diode D4 is also provided, including one terminal connected to node 624 and the other connected to node 606, and again is biased in a direction towards the node 606. Node 606 is coupled to a first output terminal (Vout+) 640. The source terminals of transistors TR3 and TR4 are connected to node 608 which is coupled to second output terminal (Vout−) 642. Node 620 is connected to node 608 by transistor TR3, and node 624 is connected to node 608 by second transistor TR4 and diode D4. A capacitor C5 is provided in parallel between the output terminals 640 and 642. Resistor R5 is also provided in parallel between the output terminals.

The secondary winding TX1(S) has a voltage induced across it according to the rate of change of magnetic flux within the transformer core. Thus, an alternating current is set up through the coil 621. When this current circulates in a first direction, diode D3 is forward biased, and the positive voltage at node 620 turns transistor TR4 on (transistor TR3 is off due to the opposite polarity at node 624). Current therefore flows thorough transistor TR4, into node 624, through coil 621, and out of node 620, causing a voltage to be set up across the output terminals 640 and 642. In this arrangement, diode D4 is reverse biased and does not conduct.

When the alternating current circulates in a second direction, diode D4 is forward biased, and the positive voltage at node 624 turns transistor TR3 on (transistor TR4 is now off due to the opposite polarity at node 620). Current therefore flows through transistor TR3, into node 620, through coil 621, and out of node 624, thereby again applying a voltage of the same polarity across the output terminals 640 and 642. The diodes D3 and D4 thereby rectify the alternating current. Capacitor C5 smoothes the output to provide an approximately constant direct current between the output terminals 640 and 642.

Figure 6:
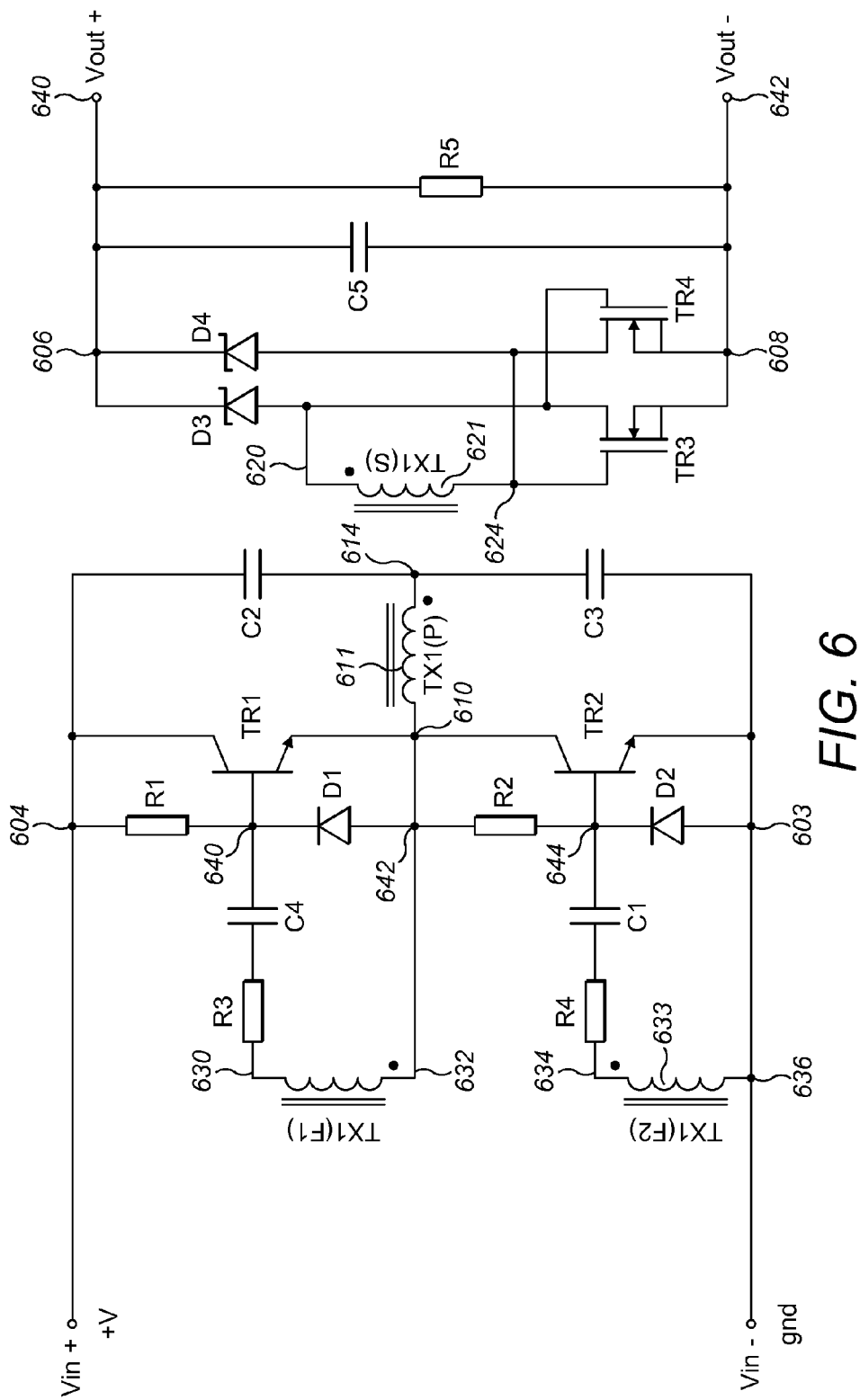
FIG. 6 illustrates a preferred embodiment of the present invention in which the embedded transformer device is a portion of a Royer half bridge circuit.

The circuit illustrated in FIG. 6 is therefore an isolated DC to DC converter, taking a DC input across terminals +V and GND, and generating a DC output across terminals 640 and 642. As will be appreciated by the skilled person, the voltage of the DC output relative to that of the DC input can be adjusted by varying the number of turns on the primary 611, 613 and secondary 621, 623 windings.

Although in the preferred embodiment of FIG. 6 the embedded transformer device is preferably included in a Royer circuit, it should be noted that its advantages may be realized in any power converter circuit topology containing an embedded transformer.

Although reference is made to conductive vias throughout the present application, it should be noted that any conductive connector, for example, conductive pins, can also be used in place of any one or more of the conductive vias.

Further, although, in the examples above, the magnetic core 304 and cavity are illustrated as being circular in shape, it may have a different shape in other preferred embodiments. Non-limiting examples include, an oval or elongate toroidal shape, a toroidal shape including a gap, EE, EI, I, EFD, EP, UI and UR core shapes. The magnetic core 304 may be coated with an insulating material to reduce the possibility of breakdown occurring between the conductive magnetic core and the conductive vias or metallic traces. The magnetic core may also include chamfered edges, providing a profile or cross section that is rounded. The use of an embedded transformer as described in relation to the preferred embodiments of the present invention therefore enables the transformer windings to be weakly coupled while also ensuring sufficient electrical isolation between the transformer windings.

Various modifications to the preferred embodiments described above are possible and will occur to those skilled in the art without departing from the scope of the present invention which is defined by the following claims.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. An embedded transformer device, comprising:
   an insulating substrate including a first side and a second side opposite the first side, and including a cavity therein, the cavity including an inner and an outer periphery;
   a magnetic core housed in the cavity;
   a primary winding extending through the insulating substrate and around a first side of the magnetic core;
   a secondary winding extending through the insulating substrate and around a second side of the magnetic core; and
   an auxiliary winding extending through the insulating substrate and around the first side of the magnetic core so as not to overlap with the primary winding and spaced away from the primary and secondary windings by a gap; wherein
   each of the primary, secondary, and auxiliary windings includes:
      upper conductive traces;
      lower conductive traces;
      inner conductive connectors extending through the insulating substrate adjacent an inner periphery of the magnetic core, the inner conductive connectors respectively define electrical connections between respective upper conductive traces and respective lower conductive traces; and
      outer conductive connectors extending through the insulating substrate adjacent an outer periphery of the magnetic core, the outer conductive connectors respectively define electrical connections between respective upper conductive traces and respective lower conductive traces;
   the inner conductive connectors of the primary winding are provided at a first constant or substantially constant distance from the inner periphery of the cavity, and the inner conductive connectors of the secondary winding are provided at a second constant or substantially constant distance from the inner periphery of the cavity;
   the inner conductive connectors of the auxiliary winding are located adjacently without inner conductive connectors of the primary and secondary windings in between;
   the inner conductive connectors of the auxiliary winding are farther from the inner periphery of the cavity than the inner conductive connectors of the primary and secondary windings, and/or the outer conductive connectors of the auxiliary winding are farther from the outer periphery of the cavity than the inner conductive connectors of the primary and secondary windings are from the inner periphery of the cavity; and
   the gap is greater than each distance between adjacent inner conductive connectors of the auxiliary winding.

2. The embedded transformer device of claim 1, wherein the first constant or substantially constant distance and the second constant or substantially constant distance are equal or substantially equal.

3. The embedded transformer device of claim 1, wherein the outer conductive connectors of the auxiliary winding are farther from the outer periphery of the cavity than:
   the first constant or substantially constant distance between the inner conductive connectors of the primary winding and the inner periphery of the cavity; and
   the second constant or substantially constant distance between the inner conductive connectors of the secondary winding and the inner periphery of the cavity.

4. The embedded transformer device of claim 1, wherein the inner conductive connectors of the primary and secondary windings, when viewed in a direction perpendicular to the first side of the insulating substrate, are arranged on a circular arc or a substantially circular arc, and the inner conductive connectors of the auxiliary winding are enclosed within a circumference of a circle corresponding to the circular arc or substantially circular arc.

5. The embedded transformer device of claim 1, wherein the inner conductive connector of the auxiliary winding closest to the primary winding is farther from the inner periphery of the cavity compared to the inner conductive connector of the auxiliary winding farthest from the primary winding.

6. The embedded transformer device of claim 1, wherein at least one of the upper or lower conductive traces is curved, or is defined by a plurality of straight sections angled with respect to one another.

7. The embedded transformer device of claim 1, wherein a conductive element is provided in the gap between the primary and auxiliary windings.

8. The embedded transformer device of claim 7, wherein the conductive element at least partially shields an electric field on one of the primary and auxiliary windings from an electric field on the other primary and auxiliary windings.

9. The embedded transformer device of claim 7, wherein the conductive element is provided at least between the inner conductive connectors of the primary winding and the inner conductive connectors of the auxiliary winding.

10. The embedded transformer device of claim 7, wherein the conductive element includes a conductive plane.

11. The embedded transformer device of claim 10, wherein the conductive plane is parallel or substantially parallel to the first and second surfaces of the insulating substrate.

12. The embedded transformer device of claim 7, further comprising;
   a first printed circuit board located on the first side of the insulating substrate, the first printed circuit board including the upper conductive traces; and/or
   a second printed circuit board located on the second side of the insulating substrate, the second printed circuit board including the lower conductive traces.

13. The embedded transformer device of claim 12, wherein the conductive element is located on the first and/or second printed circuit boards.

14. The embedded transformer device of claim 13, wherein the conductive element includes a ground plane on the first and/or second surface of the first and/or second printed circuit boards.

15. The embedded transformer device of claim 14, wherein the ground plane extends over substantially all of the surface of the first and/or second printed circuit boards that is not occupied by connections to the conductive connectors or the conducting traces.

16. The embedded transformer device of claim 7, wherein the conductive element is arranged orthogonal or substantially orthogonal to the first and second surfaces of the insulating substrate.

17. The embedded transformer device of claim 16, wherein the conductive element extends from the first side of the insulating substrate to the second side of the insulating substrate.

18. The embedded transformer device of claim 16, wherein the conductive element includes a conductive plane.

19. The embedded transformer device of claim 16, wherein the conductive element includes one or more conductive vias or pins provided in the gap.

20. The embedded transformer device of claim 1, wherein the conductive element is grounded when the embedded transformer is in operation.

* * * * *